United States Patent

Morse

[11] 4,193,724
[45] Mar. 18, 1980

[54] TORSIONAL VIBRATION DAMPENER

[76] Inventor: Glenn B. Morse, 328 Morris Ave., SE., Grand Rapids, Mich. 49503

[21] Appl. No.: 972,957

[22] Filed: Dec. 26, 1978

[51] Int. Cl.² .................................. B23Q 5/22
[52] U.S. Cl. ........................ 409/141; 82/DIG. 9; 408/143
[58] Field of Search ............ 90/11 A; 408/143, 239; 82/DIG. 4, 38 R, 38 A; 279/1 K, 1 A, 9, 62

[56] References Cited

U.S. PATENT DOCUMENTS

| | | | |
|---|---|---|---|
| 2,432,383 | 12/1947 | Colwell | 408/143 X |
| 2,729,128 | 1/1956 | Gilbert | 408/239 X |
| 3,625,529 | 12/1971 | Donachy | 82/38 R |

*Primary Examiner*—Z. R. Bilinsky
*Attorney, Agent, or Firm*—Glenn B. Morse

[57] ABSTRACT

A machine spindle with a chuck at one end and a belt sheave at the other has torsional vibrations damped by an inertial wheel loosely received over the chuck.

8 Claims, 4 Drawing Figures

TORSIONAL VIBRATION DAMPENER

BACKGROUND OF THE INVENTION

Relatively slender spindle shafts of substantial length driving a chuck at one end from a belt sheave at the other develop a resilient torsional deflection. The masses represented by the chuck and the drive sheave at the opposite ends of the slender shaft have a vibratory resonance frequency in torsion. When a work piece held by the chuck engages a cutting tool, or vice versa, the torsional flexibility of the shaft results in the tendency for the tool to cut unevenly in a chattering action as the cutting torque causes the spindle to wind up and then release in small amounts at the resonant frequency as the cutting proceeds. The result is an undesireable roughness in the cut surface. This problem has been encountered in the operation of a machine constructed as shown in my U.S. Pat. No. 3,470,789, where the spindle of a drill press functions as the spindle of a lathe and also of a milling machine.

SUMMARY OF THE INVENTION

An inertial flywheel has a bore loosely fitting over the periphery of a spindle chuck with freedom of rotation with respect to the chuck, so that the friction of this engagement damps torsional vibration of the chuck-spindle-sheave assembly. The flywheel is held in axial position preferably by a spring detent engaging a discontinuity in the chuck periphery.

DESCRIPTION OF THE PREFERRED EMBODIMENTS

Figure 1:
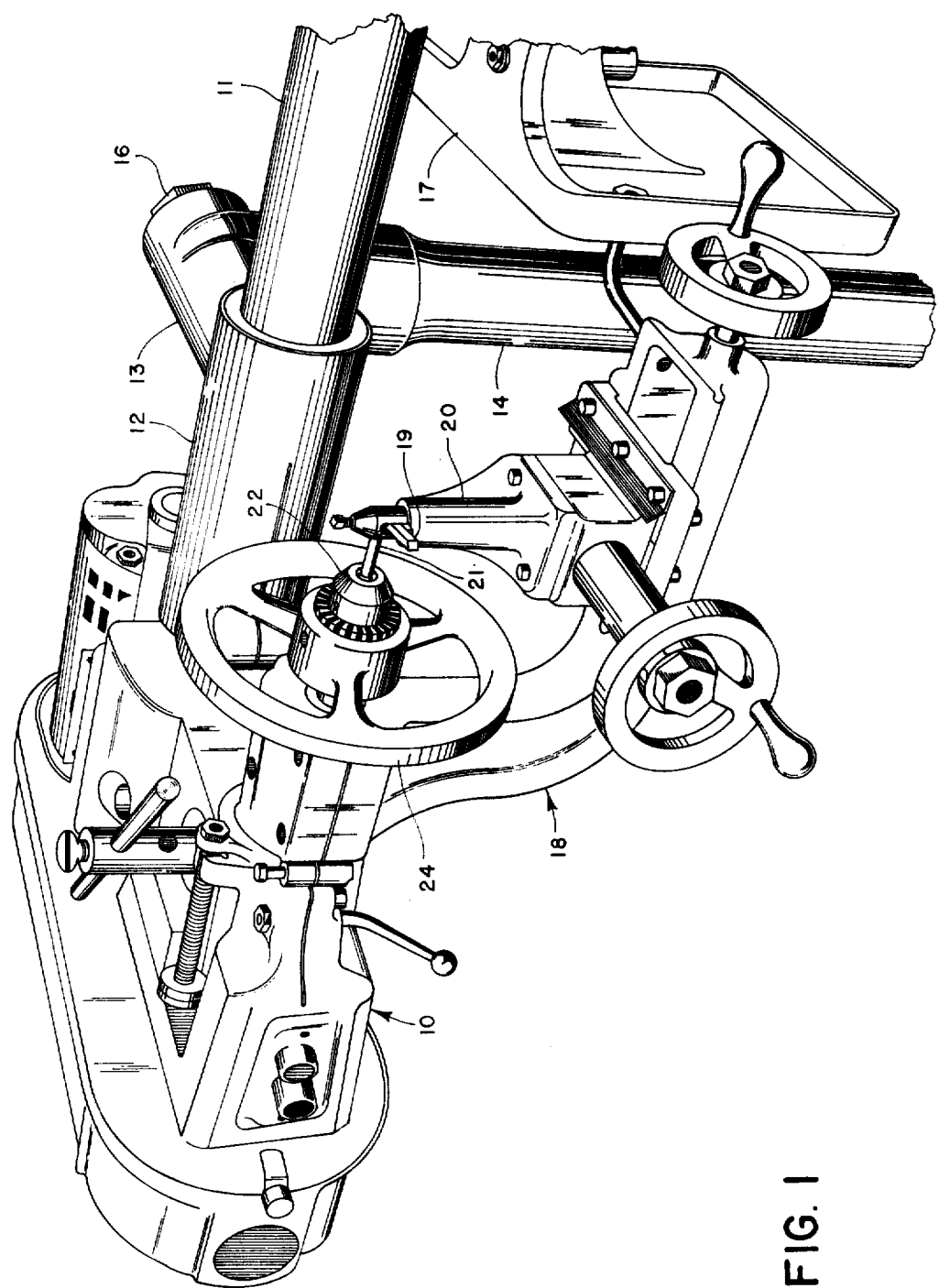
FIG. 1 is a perspective view of a machine functioning as a lathe, and showing the inertial flywheel of the present invention installed over the spindle chuck.
Figure 2:
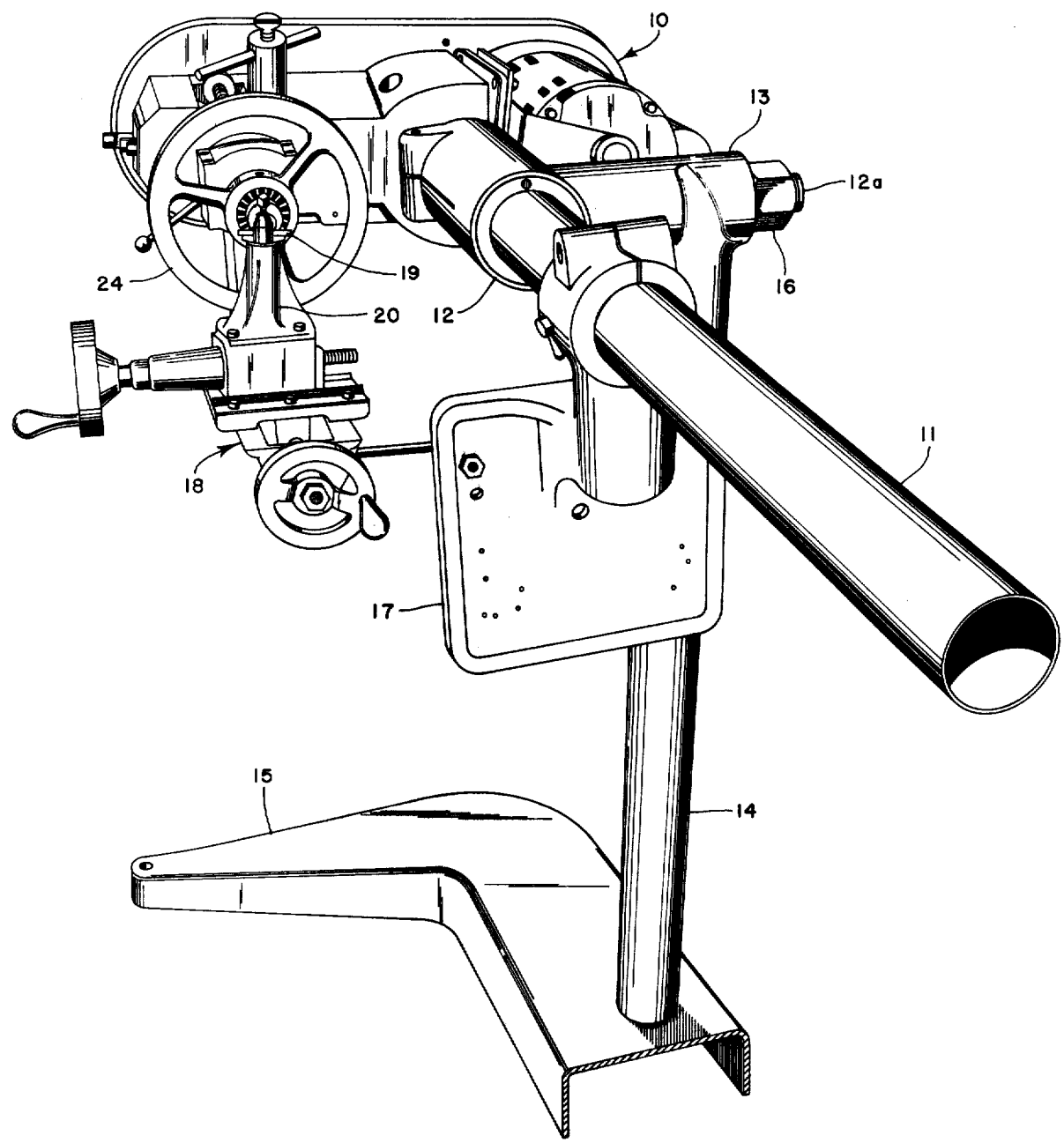
FIG. 2 is a perspective view of the installation shown in FIG. 1, taken from a position approximately a right-end elevation with respect to FIG. 1.

Referring to the drawings, the standard drill press power head 10 is shown installed on the steel tube 11, which is received within the collar 12. This collar has a shaft extension 12a rotatively received within the bearing 13 mounted on the top of the column 14, which extends upward from the base 15 (refer to FIG. 2) normally resting on a floor surface. This rotatable support for the tube 11 permits it to be placed in the illustrated horizontal position, or to function in the vertical position as a standard drill press. The nut 16 adjusts the resistance to this rotation between these positions. The machine thus far described corresponds to my U.S. Pat. No. 2,963,057.

Figure 4:
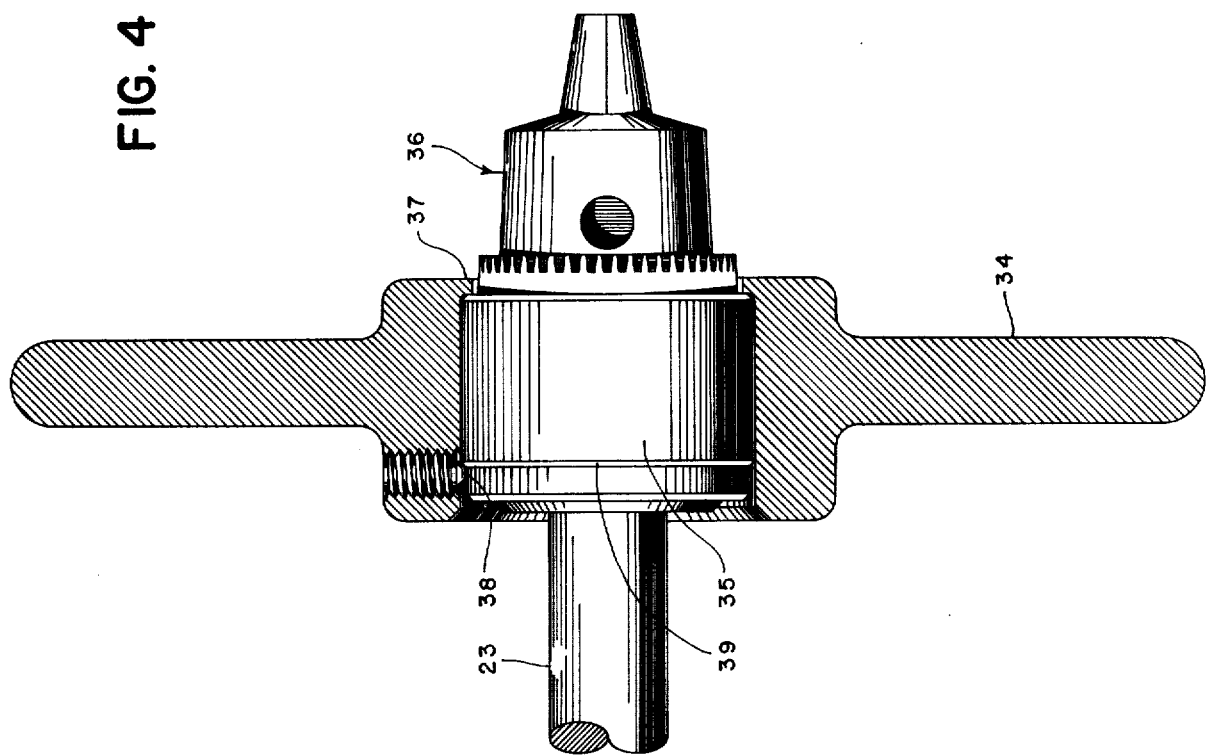
FIG. 4 is a view of a modified form of the invention with respect to the retention of the inertial flywheel on the chuck.
Figure 3:
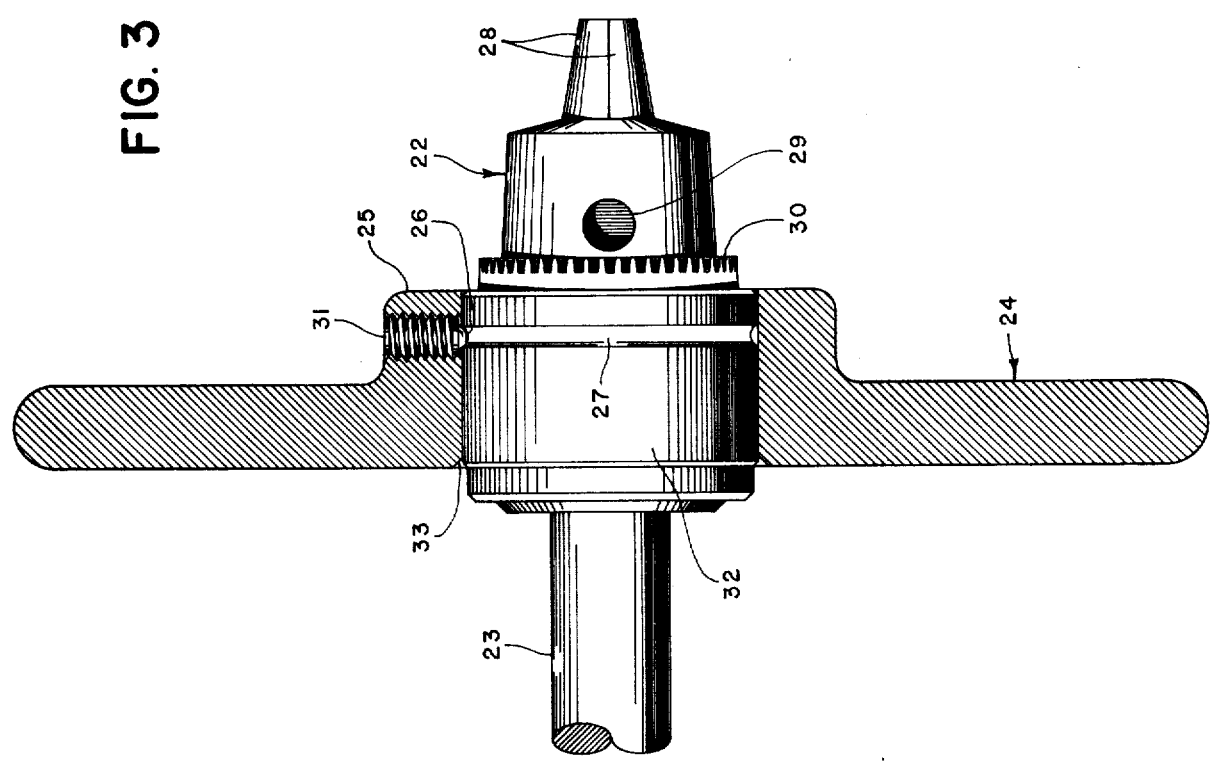
FIG. 3 is a sectional elevation on an enlarged scale showing the preferred form of the retention of the inertial flywheel on the chuck.

In the illustrated horizontal position of the base machine, the table 17 of the drill press is slipped to the right along the column 11 to provide space to accommodate the lathe attachment 18 slipped over, and clamped to, the extended quill assembly of the power head 10, as shown and described in my U.S. Pat. No. 3,470,789. The tool bit 19 supported by the post 20 is then in position to engage the work piece 21 held in the chuck 22 mounted on the spindle 23 of the power head 10. Referring to FIGS. 3 and 4, the spindle 23 is a standard component of the usual drill press power head.

Torsional vibration of the spindle 23 is damped by the installation of the inertial flywheel 24 loosely fitted over the periphery of the chuck 22, as shown in FIG. 3. The reception of the chuck periphery within the bore of the hub 25 is preferably a loose running fit. The axial position of the inertial flywheel 24 is maintained by the engagement of the spring detent 26 with the groove 27 in the periphery of the chuck 22. The portion of the chuck providing this peripheral surface is normally rotatable with respect to the remainder of the chuck to control the position of the jaws 28, the clamping action of which is usually generated by the insertion of the end of a key in the recess 29 so that the key can engage the teeth 30 and provide the necessary intensity of the clamping force. When the jaws 28 are loose, the presence of the flywheel 24 provides a handy arrangement for free-running the chuck to and from the clamped position. This feature is a useful by-product of the present invention.

The spring detent 26 is preferably of a type commonly referred to by machinists as a "die-breaker", and is essentially a device similar in exterior appearance to a set screw. The body portion 31 is received in threaded engagement with the hub 25, with the ball detent projecting as shown at 26 under the action of an interior spring (not shown). The degree of the threaded engagement into the hub 25 will determine the extent of projection of the detent 26, which should be just enough to assure retention of the device by the groove 27. The friction of the ball detent 26 in the groove 27 is not necessarily a major factor in producing the friction inducing the damping action. This appears to center primarily in the light frictional engagement of the flywheel 24 with the peripheral surface 32 of the chuck. To facilitate the installation of the flywheel from the right, it is preferable that the bore in the hub 25 be bevelled as shown at 33.

The modification shown in FIG. 4 shows an alternative arrangement for securing the axial position of the flywheel 34 on the peripheral surface 35 of the standard chuck 36. FIG. 4 illustrates the standard configuration of a drill press chuck, which does not have a groove 27 in its periphery. In the FIG. 4 arrangement, the movement of the flywheel 34 to the left during installation is limited by the small flange 37, and withdrawal to the right is inhibited by the presence of the spring detent 38 dropping behind the ridge 39 defining the axial end of the surface 35 of the chuck. The FIG. 3 arrangement provides a small increase in clearance between the flywheel 24 and the tool post 20. FIG. 4, however, does not require modification of the conventional drill press chuck. Somewhat surprisingly, the damping action of these devices is improved by the presence of a film of relatively high-viscosity oil or grease on the peripheral surface of the chuck.

I claim:

1. In combination with a machine having a frame and a spindle assembly rotatably mounted in said frame, said spindle assembly including a chuck, a torsional vibration dampener comprising:

flywheel means mounted on said chuck for at least limited relative rotation with respect thereto and with respect to said machine about the axis of rotation of said spindle assembly.

2. A combination as defined in claim 1, wherein said chuck has a cylindrical peripheral surface portion.

3. A combination as defined in claim 2, wherein said flywheel means has a hub having a bore receiving said cylindrical surface portion, and spring detent means engageable with a portion of said chuck, and adapted to maintain the axial position of said flywheel means with respect to said chuck.

4. A combination as defined in claim 3, wherein said discontinuity is an annular groove.

5. A combination as defined in claim 4, wherein said surface portion is provided by an actuating ring portion of said chuck, said ring portion having gear teeth at one axial extremity therof, said hub terminating at a position providing radial access to said gear teeth when said detent means is in engagement with said groove.

6. A combination as defined in claim 1, wherein said spindle assembly includes a shaft and a sheave mounted on the opposite end of said shaft from said chuck, and said machine additionally includes a tool carriage mounted on a guideway normally fixed with respect to said frame.

7. A combination as defined in claim 1, wherein said flywheel means is freely rotatable on and with respect to said chuck.

8. A combination as defined in claim 7, additionally including a relatively high-viscosity lubricant interposed between said chuck and said flywheel means.

* * * * *